United States Patent [19]

Nanbu

[11] Patent Number: 4,805,849
[45] Date of Patent: Feb. 21, 1989

[54] SPOOL IN A DOUBLE-BEARING TYPE FISHING REEL

[75] Inventor: Kazuya Nanbu, Tokyo, Japan

[73] Assignee: Daiwa Seiko Inc., Higashikurume, Japan

[21] Appl. No.: 100,357

[22] Filed: Sep. 23, 1987

[30] Foreign Application Priority Data

Nov. 8, 1986 [JP] Japan .......................... 61-171755[U]
Dec. 27, 1986 [JP] Japan .......................... 61-203795[U]

[51] Int. Cl.$^4$ ............................................. A01K 89/02
[52] U.S. Cl. ........................... 242/84.5 R; 242/84.1 R
[58] Field of Search .................. 242/84.1 R, 84.5 R, 242/84.51 R, 217–219; 137/312; 384/135–137; 277/53

[56] References Cited

U.S. PATENT DOCUMENTS 4,681,276 7/1987 Sato ................................ 242/84.1 R
4,696,480 9/1987 Jornhagen ............................ 277/53

Primary Examiner—Stuart S. Levy
Assistant Examiner—Steven M. du Bois
Attorney, Agent, or Firm—Cushman, Darby & Cushman

[57] ABSTRACT

A spool designed to be mounted in the frame of a double-bearing type fishing reel. The spool has a flange at each end. Each flange has a peripheral shoulder wherein a peripheral groove is cut. The spool is designed for rotary movement. This rotary movement of the spool is designed to be stopped when one of the peripheral shoulders comes in contact with a brake board. Water-drops are collected in the peripheral groove thereby preventing their accumulation on the peripheral shoulder where they would contact the brake board and inhibit the braking action. A water draining hole is formed in a lower portion of the frame.

4 Claims, 2 Drawing Sheets

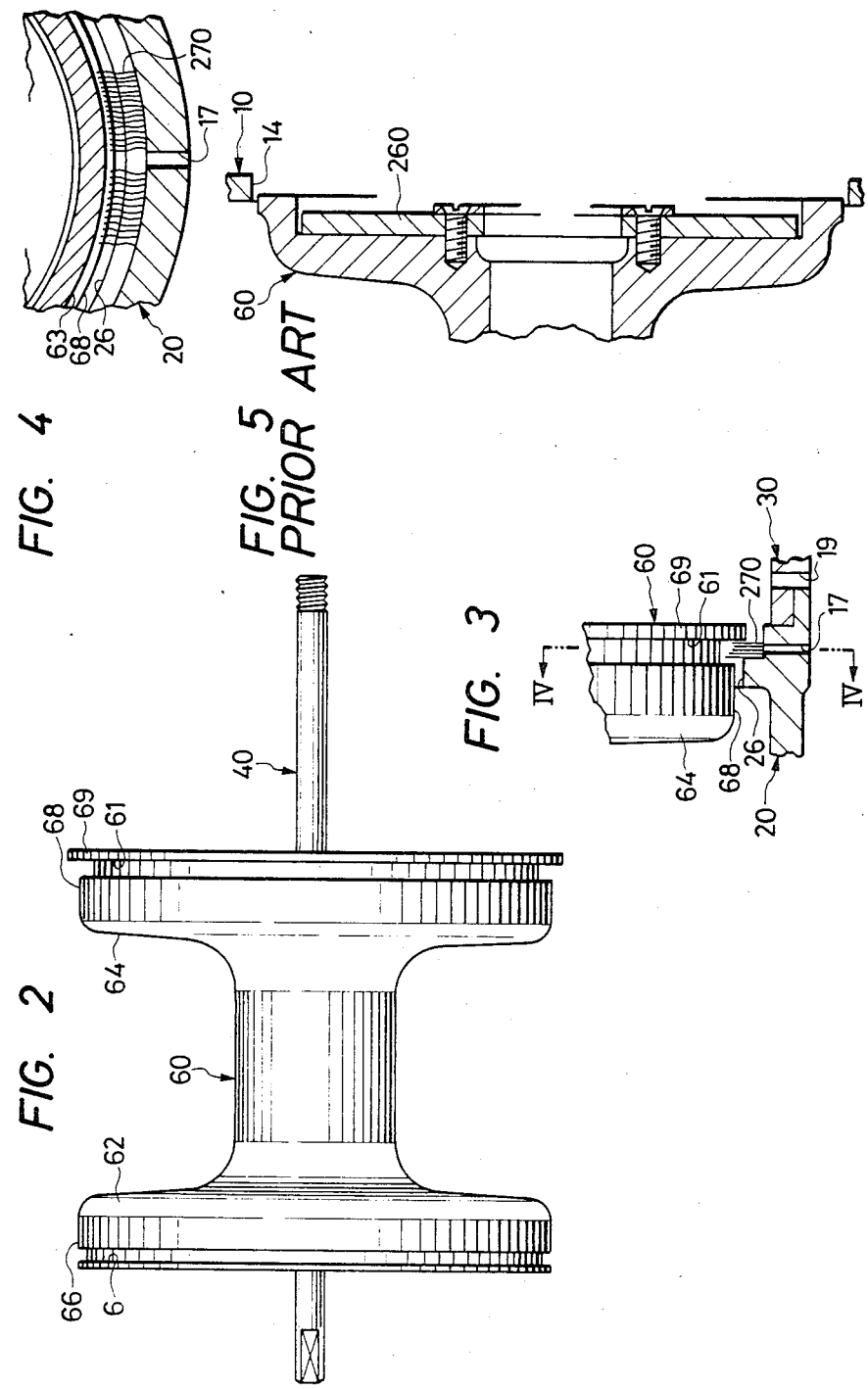

SPOOL IN A DOUBLE-BEARING TYPE FISHING REEL

This invention relates to a spool for a double-bearing type fishing reel and more particularly to a double-bearing type fishing reel which is designed to protect that portion of the spool which contacts a brake board from being wet by water or the like.

BACKGROUND OF THE INVENTION

In a conventional double-bearing type fishing reel, as depicted in FIG. 5 (PRIOR ART), a spool disposed for rotation is provided around which a fishing reel is wound. The spool has flanges on both ends. Each flange has a peripheral shoulder. The flanges of the spool are mounted in a frame which has an inner cylindrical wall. A brake board which is disposed to contact the inner cylindrical wall of the frame is provided to brake the rotary motion of the spool. A small gap exists between the peripheral shoulder of the flange and the inner cylindrical wall of the frame, so that when water-drops from rain, humidity and the like stick on the spool, they are held in this small gap by capillary forces. These water-drops then flow over the peripheral shoulder of the flange to the brake board thereby wetting the brake board and decreasing the drag brake force. Furthermore, when sea water is splashed on the spool during fishing or water is applied to the spool to wash the reel after fishing, the peripheral shoulders of the flanges of the spool become wet, and as a result the drag brake force is reduced.

SUMMARY OF THE INVENTION

In view of the foregoing, it is an object of this invention to provide a spool for a double-bearing type fishing reel designed to prevent the brake board from becoming wet.

It is a further object of the invention to provide a double bearing type fishing reel wherein the drive mechanism of the reel is protected from water.

It is a feature of the present invention to provide a peripheral groove cut into the peripheral shoulder of a flange on the spool of a double-bearing type fishing reel.

It is another advantage of the present invention that water-drops collected in the peripheral groove are allowed to exit the reel by their own weights.

It is an advantage of the present invention that when water is splashed on the spool, the side of the flange is protected from water.

These objects and advantages of the present invention are achieved by a fishing reel having a peripheral groove, for collecting water-drops from a spool, cut into the peripheral shoulder of a flange of the spool. The outer side wall of the peripheral groove is located in a peripheral part of the flange which is larger in diameter than the peripheral shoulder. A water draining hole is formed in the lower portion of the frame of the fishing reel through which the water-drops exit the reel.

BRIEF DESCRIPTION OF THE DRAWINGS

FIG. 2 is a side view of the spool shown in FIG. 1, FIG. 3 is a longitudinal sectional side view showing essential components of one embodiment, FIG. 4 is a front view showing the inner side of a frame in the modification, and FIG. 5 is a sectional side view showing essential components of a spool and a frame in a conventional fishing double-bearing type fishing reel.

DETAILED DESCRIPTION OF THE PREFERRED EMBODIMENT

Figure 1:
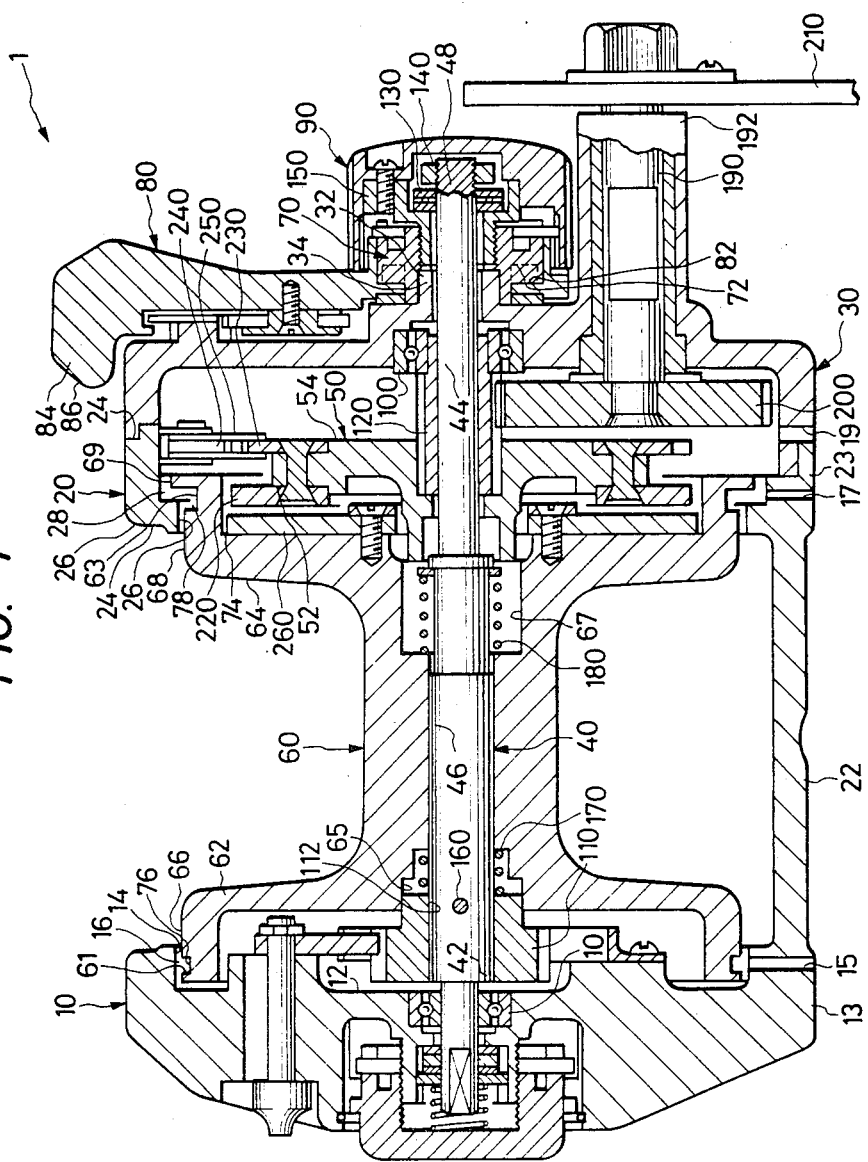
FIG. 1 is a longitudinal sectional side view of one embodiment of a double-bearing type fishing reel.

Turning now to the figures wherein like numerals correspond to like parts throughout, FIG. 1 depicts the fishing reel 1 of the present invention. Frames 10 and 20 are connected by a plurality of supporting bars 22 so that frames 10 and 20 are held parallel to each other. Frame 20 has an inner cylindrical wall 26 and an outside wall 24. A reel side plate 30 is secured to the outside wall 24 of the frame 20. A spool shaft 40 is supported by bearings 100 which are fixedly fitted in the frame 10 and the reel side plate 30, respectively, in such a manner that the spool shaft 40 is movable perpendicularly to frames 10 and 20. A locking member 110 is mounted on a first end portion 42 of the spool shaft 40 on a first side 12 of the frame 10, and a pinion 120 on which a drag disk 50 is fixedly mounted is mounted on a second end portion 44 of the spool shaft 40 on the outside wall 24 of the frame 20. A spool 60 is mounted on the middle portion 46 of the spool shaft 40. The second end portion 44 of the spool shaft 40 extends through the reel side plate 30. A thrust bearing 130 is mounted on the second end portion 44 thus extended. A nut 140 is threadably engaged with the second end portion 44 at its end 48. A slidable cam member 70 is fitted slidably on a cylindrical hollow shaft 32 which is formed on the outside 34 of the reel side plate 30. A knob holding member 150 is threadably engaged with the slidable cam member 70. The slidable cam member 70 and the knob holding member 150 are attached by the thrust bearing 130 and the nut 140. A spool brake lever 80 is connected to the slidable cam member 70. A drag adjusting knob 90 is secured to the knob holding member 150 in such a manner as to cover the knob holding member 150.

The spool brake lever 80 has a cam surface 82 which abuts an operating protrusion 72 of the slidable cam member 70. A knob 84 protrudes from a first side 86 of the spool brake lever 80 towards the spool 60 in such a manner that it is extended over the reel side plate 30.

The spool 60 has flanges 62 and 64 on both sides. The flanges 62 and 64 have peripheral shoulders 66 and 68, respectively, which are confronted with the inner cylindrical walls 14 and 26 of the frames 10 and 20 with gaps 16 and 28 therebetween, respectively.

The locking member 110 is secured to the first end portion 42 of spool shaft 40 with a pin 160. The locking member 110 has an engaging part 112 which is engaged with an engaging hole 65 of the spool 60. Inside the engaging hole 65, a spring 170 is mounted on the spool shaft 40. The spool 60 has a hole 67 on the second end portion 44 of spool shaft 40. In the hole 67, a spring 180 is mounted on the spool shaft 40. Springs 170 and 180 are mounted on the spool shaft 40 in such a manner as to hold the spool shaft 40 therebetween.

The above-described pinion 120 is rotatably mounted on the spool shaft 40 and is engaged with a drive gear 200 which is secured to a handle shaft 190. A handle 210 is fastened to the outer end 192 of the handle shaft 190.

A contact board 220 is fixedly secured to the inner wall 52 of the drag disk 50 which is confronted with the spool 60, and a ratchet wheel 230 is fixedly secured to the outer wall 54 of the drag disk 50 which is confronted with the reel side plate 30. A stopper 240 is engaged with the ratchet wheel 230 with the aid of a supporting piece 250 adapted to support the ratchet wheel 230 from both sides when the spool 60 is turned in the reverse direction to extend a fishing line, so that the rotation of the drag disk 50 in the reverse direction is prevented. A brake board 260 is fixedly secured to the outer wall 74 of the flange 62 of the spool 60 which is confronted with the contact board 220.

As shown in FIG. 1 and 2, peripheral grooves 61 and 63 are formed in the peripheral shoulders 66 and 68 of the two side flanges 62 and 64 of the spool 60 so as to collect water-drops stuck to the spool 60. Drain holes 15, 17 and 19 are formed in the lower portions 13 and 23 respectively of frames 10 and 20 confronted with the peripheral shoulder 66 and 68 and of the reel side plate 30, respectively.

The flange 62 of frame 20 has a peripheral part 69 outside the peripheral groove 61. The peripheral part 69 is larger in diameter than the peripheral shoulder 68.

As was described above, the peripheral grooves 61 and 63 collect water-drops formed in the peripheral shoulders 66 and 68 of the flanges 62 and 64 of the spool 60. Therefore, water-drops on the spool 60 are collected in the peripheral grooves 61 and 63; however, no capillary action takes place because the gaps 16 and 28 between the peripheral grooves 61 and 63 and the inner cylindrical walls 14 and 26 of the frames 10 and 20 respectively are relatively large. Accordingly, the water-drops are allowed to fall down so that they are pooled in the lower portions 76 and 78 of the peripheral grooves 61 and 63 respectively. The water-drops in the peripheral grooves 61 and 63 drop through the drain holes 15, 17 and 19 by their own weights.

As the peripheral part 69 is larger in diameter than the peripheral shoulder 68 no water-drops are transferred to the outer side wall 74 of the flange 64. Therefore, the brake board 260 secured to the outer side wall 74 of the flange 64 will never be wet by water-drops. Accordingly, in braking a fishing line the ratchet wheel 230 is turned in the reverse direction as the fishing line is extended so that it engages the stopper 240 to stop the rotation of the drag disk 50, and the cam surface 82 of the spool brake lever 80 is caused to push the operating protusion 72 of the slidable cam member 70 outwardly by rotation of the spool brake lever 80, as a result of which the spool shaft 40 is slid to the right-handed side of FIG. 1 through the knob holding member 150, the thrust bearing 130 and the nut 140, and the brake board 260 of the spool 60 is abutted against the contact board 220, so that the drag brake force can be positively controlled according to the pressure applied thereto.

As no water-drops or water-splashes are allowed to flow to the outer side wall 74 of the flange 64 where the brake board 260 is provided, components of the drag brake mechanism and of the drive mechanism can be protected from the entrance of water-drops or water-splashes. Accordingly, the rusting of the reel 1 and the deterioration of the reel 1 lubricant is thereby eliminated according to the invention.

The reel 1 may also be provided with annular grooves (not shown) cut in the inner cylindrical walls 14 and 26 of the frames 10 and 20 which confront the peripheral shoulders 66 and 68 of the flanges 62 and 64 respectively. These grooves should be larger in depth towards the lower ends of the flanges 62 and 64. The formation of the annular grooves can reduce the quantity of water which, while dropping out through the drain holes 15, 17 and 19, is caused to flow to the outer peripheries of the flanges 62 and 64 by the rotation of the spool 60.

FIGS. 3 and 4 show another embodiment of the spool 60 according to the invention. In this embodiment, bristles 270 are fastened in the lower portion 23 of the frame 20 which is confronted with the peripheral groove 61 of the spool 60 in such a manner that the bristles 270 are located at the middle of the width of the groove 61. Therefore, the water-drops in the peripheral groove 61 are positively and quickly moved down the bristles 270 to the drain hole 19.

The bristles 270 may also be provided for frame 10 in the same manner.

What I claim is:

1. A double-bearing type fishing reel comprising: first and second frames each having a lower portion; a spool having an axis therethrough and first and second flanges, said first and second flanges each having a peripheral shoulder, said spool being mounted between said first and second frames and disposed for rotation about its axis and having first and second peripheral grooves therein having an outside wall formed in the respective peripheral shoulder, each shoulder having a diameter and a peripheral part formed on the outer side wall of said peripheral groove, said peripheral part of at least one shoulder having a larger diameter than said peripheral shoulder;
a means in contact with said spool for rotating said spool about its axis;
a means disposed to contact said spool for stopping the rotation of said spool about its axis.

2. A fishing reel as in claim 1, wherein said first and second frames each comprise means for draining water from the lower portion of said first and second frames respectively.

3. A fishing reel as in claim 2, wherein said draining means is at least one hole disposed in the lower portion of each said frame.

4. A fishing reel as in claim 3, wherein said draining means includes bristles disposed within said peripheral groove.

* * * * *